US 8,387,055 B1
Feb. 26, 2013

(12) United States Patent
Kuwamoto et al.

(54) SYSTEM AND METHOD FOR PROVIDING INFORMATION AND ASSOCIATING INFORMATION

(75) Inventors: Sho Kuwamoto, San Francisco, CA (US); David W. George, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1078 days.

(21) Appl. No.: 12/355,718

(22) Filed: Jan. 16, 2009

Related U.S. Application Data

(62) Division of application No. 09/875,549, filed on Jun. 6, 2001, now Pat. No. 7,480,910.

(60) Provisional application No. 60/292,645, filed on May 21, 2001, provisional application No. 60/291,145, filed on May 15, 2001.

(51) Int. Cl.
  G06F 9/46 (2006.01)
  G06F 3/00 (2006.01)

(52) U.S. Cl. ........................ 718/102; 719/311

(58) Field of Classification Search .................. None
See application file for complete search history.

(56) References Cited

U.S. PATENT DOCUMENTS

| | | | |
|---|---|---|---|
| 4,513,391 A | 4/1985 | Maddock | |
| 5,295,256 A | 3/1994 | Bapat | |
| 5,764,890 A | 6/1998 | Glasser et al. | |
| 5,870,552 A | 2/1999 | Dozier et al. | |
| 5,907,837 A | 5/1999 | Ferrel et al. | |
| 5,937,417 A | 8/1999 | Nielsen | |
| 5,945,989 A | 8/1999 | Freishtat et al. | |
| 6,012,083 A | 1/2000 | Savitzky et al. | |
| 6,026,433 A | 2/2000 | D'Arlach et al. | |
| 6,029,141 A | 2/2000 | Bezos et al. | |
| 6,073,163 A | 6/2000 | Clark et al. | |
| 6,078,935 A | 6/2000 | Nielsen | |
| 6,176,425 B1 | 1/2001 | Harrison et al. | |
| 6,219,680 B1 | 4/2001 | Bernardo et al. | |
| 6,338,434 B1 | 1/2002 | Wilz et al. | |
| 6,377,259 B1 | 4/2002 | Tenev et al. | |
| 6,389,472 B1 | 5/2002 | Hughes et al. | |
| 6,393,469 B1 | 5/2002 | Dozier et al. | |
| 6,418,441 B1 | 7/2002 | Call | |
| 6,470,349 B1 | 10/2002 | Heninger et al. | |
| 6,507,867 B1 | 1/2003 | Holland et al. | |
| 6,560,639 B1 | 5/2003 | Dan et al. | |
| 6,564,259 B1 | 5/2003 | Baber et al. | |
| 6,625,581 B1 | 9/2003 | Perkowski | |
| 6,674,450 B1 | 1/2004 | Toub et al. | |
| 6,728,705 B2 | 4/2004 | Licon et al. | |

(Continued)

OTHER PUBLICATIONS

Microsoft Computer Dictionary $5^{th}$ Edition, Microsoft Press: Redmond Washington, (2002), definition for "object" (page unknown) and definition for "tag" (pp. 511).
"Difference between 'Client Side' and 'Server Side'" http://www.eggheadcafe.com/print.asp (accessed on Jun. 20, 2005) (2 pages).
"Server-side code," SitePoint Glossary (accessed on Jun. 20, 2005) (1 page).

(Continued)

*Primary Examiner* — Kenneth Tang
(74) *Attorney, Agent, or Firm* — Fish & Richardson P.C.

(57) ABSTRACT

A system and method builds a set of information by providing information related to each object of a first type surrounded with a pair of identifiers. Information related to objects of a second type is provided with an embedded identifier. Information received from a server is associated with one or more first objects by locating a pair of identifiers in the information and associating the information with one or more objects corresponding to the pair of identifiers.

32 Claims, 7 Drawing Sheets

U.S. PATENT DOCUMENTS

| | | |
|---|---|---|
| 6,762,761 B2 | 7/2004 | Devins et al. |
| 6,785,717 B1 | 8/2004 | Nickerson et al. |
| 6,961,750 B1 | 11/2005 | Burd et al. |
| 6,990,653 B1 * | 1/2006 | Burd et al. .................... 717/108 |
| 7,000,184 B2 | 2/2006 | Matveyenko et al. |
| 7,480,910 B1 | 1/2009 | Kuwamoto et al. |
| 7,685,229 B1 | 3/2010 | George et al. |
| 2002/0021758 A1 | 2/2002 | Chui |
| 2002/0087583 A1 | 7/2002 | Morgan et al. |
| 2003/0204810 A1 | 10/2003 | Dam et al. |
| 2003/0225853 A1 | 12/2003 | Wang et al. |

OTHER PUBLICATIONS

"Server-side code," Server Side Code, web design by Chris Gimbless (accessed on Jun. 20, 2005) (2 pages).

"Server-Side vs. Client-Side Scripting," ASP101—Quick Tips (accessed on Jun. 20, 2005) (1 page).

* cited by examiner

```
                    ┌─ OBJECT TYPE 1
<% FOO = "ONE.GIF" %>
                ┌─ OBJECT TYPE 2
<IMG SRC="<%=FOO%>">
``` would become:

```
           ┌─ IDENTIFIER 1
<!--MMDW 0-->

<% FOO = "ONE.GIF" %>
           ┌─ IDENTIFIER 2
<!--MMDW 1-->
                    ┌─ IDENTIFIER 3
<IMG MMDW=0 SRC="<%=FOO%>">
```

FIG. 7

SYSTEM AND METHOD FOR PROVIDING INFORMATION AND ASSOCIATING INFORMATION

RELATED APPLICATIONS

This application is a divisional of and claims benefit of the priority of U.S. patent application Ser. No. 09/875,549, filed Jun. 6, 2001, U.S. Pat. No. 7,480,910, to issue on Jan. 20, 2009, and entitled "System and Method for Providing Information and Associating Information", which claims the benefit of the priorities of U.S. Provisional Application No. 60/291,145, filed May 15, 2001, and entitled, "Method and Apparatus for Displaying Server Side Results in an Application Program", and of U.S. Provisional Application No. 60/292,645, filed May 21, 2001, and entitled, "System and Method for Displaying Server Side Results in an Application Program"; all three prior applications are hereby incorporated by reference.

FIELD OF THE INVENTION

The present invention is related to computer software and more specifically to computer software for web page authoring.

BACKGROUND OF THE INVENTION

Conventional web pages include commands such as HTML commands that can cause a browser to render text, images, links and other conventional components of a web page. Some web pages are provided to a user exactly as they are stored on a server by a web site administrator. The user requests the web page using a browser, and the server provides the web page to the browser. Such web pages are referred to herein as "static" web pages because they do not change from one user to the next or from one user's circumstance to the next.

Static web pages are easy to design and modify using conventional application programs such as web authoring tools or even a text editor. A designer can lay out a web page on the designer's computer system without any programming knowledge, and can easily view it using a browser on the designer's computer system. When the web page appears exactly as the designer prefers it to appear, the designer or web site administrator can upload the page to the server for viewing by any party who requests it.

Some web pages are built on demand by a computer program running on the server. When the server receives the request, the program retrieves information required to build a web page, builds the page, and sends it to the user's browser or other requester. Such web pages are referred to herein as "dynamic" because they can change from one user to the next and from one user's circumstance to the next. After the web page is dynamically built and sent to the user's browser by the server, however, it is indistinguishable from a static web page.

Dynamic web pages can be more flexible than static web pages, because the programs that generate them can provide custom information or provide the latest information retrieved from a database. However, dynamic web pages require the services of a computer programmer to build or even change the layout of the web page. To test how any dynamic web pages will appear, the program must be uploaded to the server, debugged and run. This can extend the time it takes to complete a web page, because the programmer cannot see how a web page produced by the program will appear in a browser without actually testing and running the program.

A hybrid approach to building dynamic web pages is achieved by embedding server side code in otherwise static web pages. The hybrid approach allows a non-programmer designer to create a web page with static elements defined by HTML commands and with dynamic elements defined by server side code. There are many languages that may be used as server side code in hybrid web pages. The conventional Active Server Pages (ASP) is a server side language commercially available from Microsoft Corporation of Redmond, Wash. The conventional Java Server Pages (JSP) is a server side language commercially available from Sun Microsystems of Palo Alto, Calif. The conventional Cold Fusion Markup Language (CFML) is also a server side language, commercially available from Allaire Corporation of Newton, Mass., now owned by Macromedia, Inc., of San Francisco, Calif. These languages are interpreted as described below by application server software packages sold by the vendors listed above, as well as BEA Systems, Inc., of San Jose, Calif. and International Business Machines of White Plains, New York.

A designer can design the web page and either insert the server side code or have a programmer add the server side code to the web page the designer designs. The web site administrator or designer uploads a file containing the hybrid web page in a manner similar to that used for static web pages. When a user requests the web page through a browser, however, the server that retrieves the file also interprets any server side code, retrieves information according to the server side code, and substitutes the information in place of the server side code. The server may also insert other commands (such as those that set the value of a variable) into the file. Only then does the server provide the web page to the browser. As with dynamic web pages, the browser does not distinguish between the hybrid web page and a static web page.

Hybrid web pages built using ASP, JSP, CFML, or another form of server side code can be simpler for non-programmers to design and change than web pages built by a program. One way that using server side code eases web page design is enabling rapid visualization of web pages during the design process. For example, a web page designer can preview the hybrid page by retrieving it with a conventional browser. Although the browser will not be able to render the server side code as anything other than text that shows the code, the designer will be able to see how the non-server-side code elements of the page will appear.

Some application programs such as web authoring tools assist a designer in designing either static web pages or hybrid web pages using server side code. For example, the conventional Macromedia Dreamweaver 3 product commercially available from Macromedia, Inc., of San Francisco, Calif., provides a graphical user interface that allows web pages to be designed graphically. The user interacts with the graphical user interface to manipulate graphical representations of the different parts of the web page, and the application program builds the HTML code that corresponds to the graphical representations. The web page designer views the graphical user interface in one or more graphics windows and can view or change the corresponding HTML code in a code window.

Application programs such as Dreamweaver 3 allow designers to perform and visualize modifications to web pages more rapidly than off-line previewing. Such an application program allows the user to see in the graphics window an approximation of how the web page will appear in a browser and make changes using either the graphics window or the code window. The program then automatically updates the contents of the other window to reflect the changes. The use of such programs allows changes made to the web page to be instantly seen in the graphics window as the designer designs the page, rather than following a storage, retrieval, and reloading delay for the browser. This can significantly shorten the time it takes to design a web page.

Some application programs such as Dreamweaver 2 formerly available from Macromedia allow a designer to include server side code in a web page. However, these application programs do not display to the designer the actual data that will be viewed by a user who requests the page from the server. Instead, such an application program displays placeholders in the graphics window for data corresponding to server side code. The placeholders may be icons of the appropriate dimensions set at the appropriate locations.

The placeholder approach offers the designer an approximate visualization of the location and other characteristics of the dynamic elements of the web page, and thus can help speed the design process somewhat. Moreover, because the visualization occurs within the graphics window, the location and other characteristics of the dynamic elements may be modified and re-visualized more easily than when previewing occurs in a browser. However, the designer still cannot view actual data that would be substituted into the web page by the server according to the server side code. So the designer cannot determine within the graphics window whether the server side code will perform as the designer intends it to perform. While a designer can upload the web page, request it and view the result, this is a cumbersome and time-consuming process that must be repeated each time a modification is made to the server side code having results that the designer would prefer to view. Furthermore, because the data that gets built into the web server may periodically change, the designer would have to periodically upload the latest version and then rerequest the web page in order to see the latest layout with the latest data or to see how the web page will appear in response to changing data, a cumbersome and time-consuming process.

What is needed is a method and system that can display the server side code results for one or more web pages in a web authoring tool or other application program, can optionally allow modifications to be made to the layout of the web pages, and can optionally update the server side code results in the web authoring tool or other application easily, at the request of the user as server side code is changed, or periodically.

Although the issues above have been described with respect to web pages, it may be desirable to apply the solutions to any type of information. What is needed is a system and method for building a set of information and associating information received from a server with one or more objects.

SUMMARY OF INVENTION

A system and method surrounds each object of a first type, for example, server side code, in a set of objects with a pair of identifiers, such as identifiers that are returned unchanged by a processing system, for example, HTML tags. Each of the tags in the pair may contain a location identifier, unique from the other similar tags. The system and method may also provide for object having a second type, for example tags that are not completely made of server side code, information related to the object and an embedded identifier, such as an attribute of a tag. The method and system associates information received from a server with one or more objects by locating a pair of identifiers and associating the information between the pair identifiers with one or more objects corresponding to the pair of identifiers, for example by matching one or more object identifiers in the identifiers with an object identifier of the object. Each identifier in the pair has a first type and a second type, such as even and odd object identifiers. Such objects with which the information is associated may correspond to server side code. The system and method may additionally locate a second identifier and associate information corresponding to such identifier with another object, such as an object not made up entirely of server side code, for example, a tag. This association may be made by matching an object identifier of the identifier to that of the object.

BRIEF DESCRIPTION OF THE DRAWINGS

FIG. 7 is an illustration of Examples 3 and 4.

DETAILED DESCRIPTION OF A PREFERRED EMBODIMENT

Figure 1:
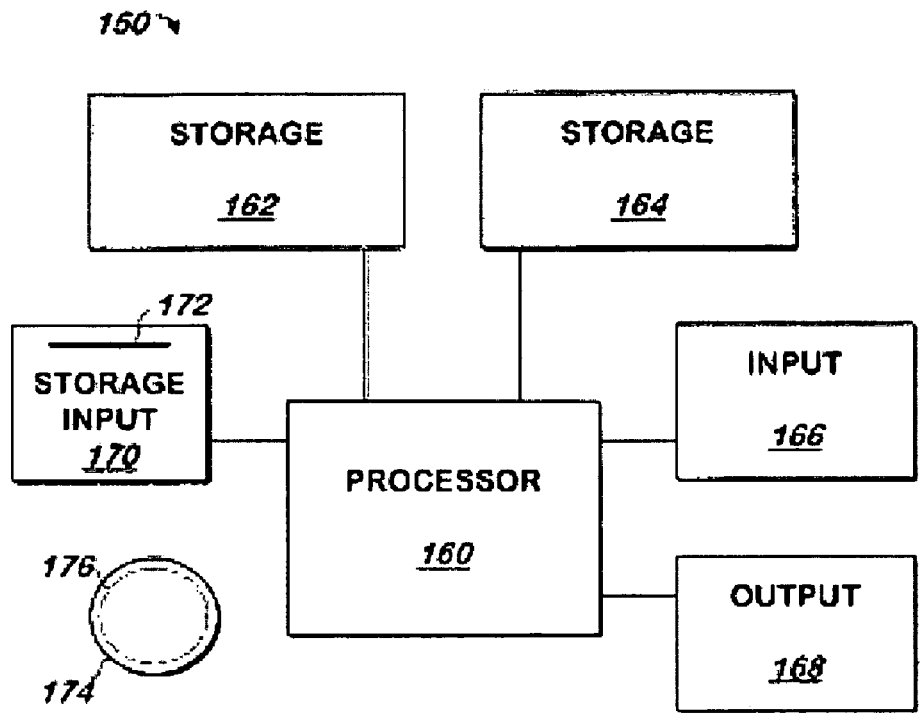
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Pentium- or Celeron-compatible computer system such as those commercially available from Hewlett-Packard Corporation of Palo Alto, Calif., running the Windows Operating system commercially available from Microsoft Corporation of Redmond, Wash., or a Sun Microsystems Ultra 10 computer running the Solaris operating system commercially available from Sun Microsystems of Palo Alto, Calif., although other systems may be used.

Figure 2A:
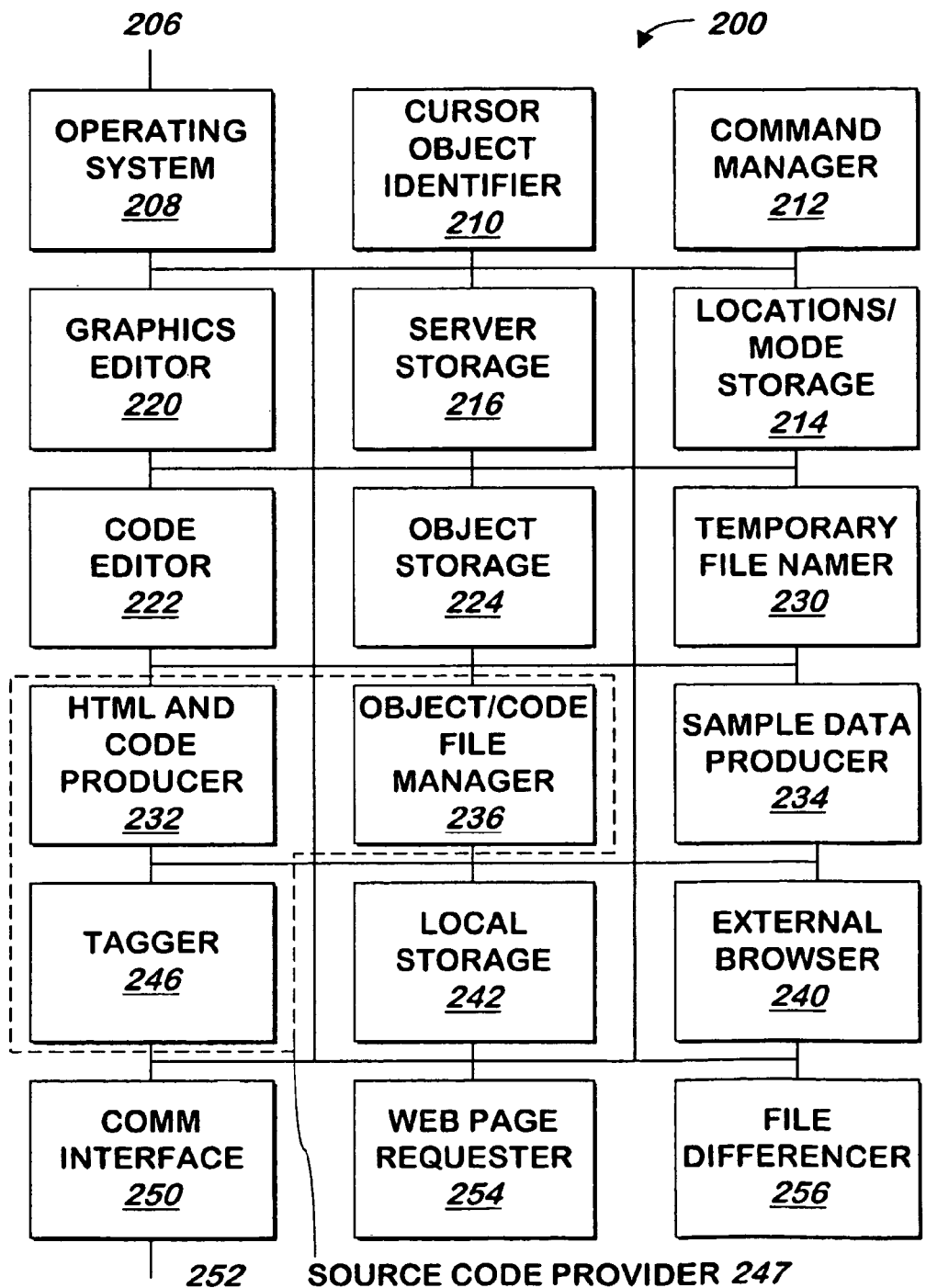
FIG. 2A is a block schematic diagram of a system for displaying and updating server side code results in a web authoring tool or other application program, according to one embodiment of the present invention.

Referring now to FIG. 2A, a system 200 for displaying and updating server side code results is shown according to one embodiment of the present invention. The present invention is described below with respect to web pages, however the present invention applies equally to any type of file, any file capable of being read by a web browser or any type of file used as source code to generate such a file.

In one embodiment, to design a web page, the user defines objects on the web page by clicking or typing into either a graphics window or a code window. If the user clicks into the graphics window, the coordinates of the mouse cursor are passed to the graphics editor 220 and if the user clicks into the code window, the coordinates are passed to the code editor 222. In one embodiment, the graphics window may be made up of a main graphics window and several additional windows independent of the graphics window. Some of these windows may be command windows to allow the user to perform commands or define parameters, such as the location of a file.

In one embodiment, the graphics editor 220 displays a WYSIWYG graphical editor in a graphics window on the display screen with an object cursor defining the location of insertion of objects and a mouse cursor allowing selection of objects and change in location of the object cursor. User input and output to the system 200 is performed via operating system 208 and input/outputs 206. Graphics editor 220 also displays any objects already defined on the web page in the graphics window.

Each object defined on the page has an object data structure in object storage 224, which graphics editor 220 reads to display the objects in the graphics window. The object data structure for an object has the type of the object (the default object, text, image, form element, server side code, etc.) and other properties for the object, such as the size and location of a rectangular boundary containing the object, as well as the size of the object (e.g. font size of a text object), color and background information, and other information such as the location of a file to use for the background. Another property is the HTML tag or tags or other similar source code text that should be generated to cause a conventional browser to display the object on a web page, including starting tags (e.g. "<B>") and end tags (e.g. "</B>". In the case of an object containing server side code, one property is the code itself, and other properties contain information related to the display of the server side code, described in more detail below.

Graphics editor 220 can be used by a user to graphically add or alter objects in object storage 224. In one embodiment, when graphics editor 220 receives the coordinates of the mouse cursor, graphics editor 220 passes the coordinates to cursor object identifier 210. Cursor object identifier 210 identifies whether the mouse cursor was above or very near an object in the main graphics window or above one of the additional windows by consulting the locations and sizes of the objects and other windows in object storage 224. If the mouse cursor was above such an object or window, cursor object identifier 210 identifies the object or other window to graphics editor 220.

If cursor object identifier 210 identifies an object, graphics editor 220 highlights the object by drawing a border around its edges in the main graphics window. Size tabs appear on the border to allow a user to graphically adjust the size of the object by dragging one of the size buttons. The user may edit the properties of the object, for example, by repositioning the object. The user may also delete the object or copy it to the clipboard. Graphics editor 220 makes corresponding changes to the properties for the object data structure or deletes the object data structure for the object identified by cursor object identifier 210 in response to the user's changes.

If the mouse cursor is clicked when it is not over an object, the object cursor is moved to a nearby object already defined on the page or to the upper left most portion of the page if no objects are already defined.

Using the object cursor, a user may insert new objects onto the page. Unless the user specifies another type of object, a text object, the default inserted object, may be added at the location of an object cursor by typing on the keyboard. Other objects such as images or form elements may be added using menu commands, such as "insert-image", or graphically-based commands. If a user adds an object, the object is added with its upper-left most corner at the location of an object cursor.

In one embodiment, there are other ways of inserting objects, such as by dragging an object from an object palette onto the main graphics window or copying/cutting and pasting the object. Any conventional graphical or command driven method may be used to insert objects onto the web page using the main graphics window.

In one embodiment, after making any changes indicated by the user, graphics editor 220 refreshes the graphics window, using the values in object storage 224 to recreate the representation of each object in the web page.

In one embodiment, an optional code window may be displayed in addition to the graphics window. The code window contains the HTML and other code from the objects in object storage 224 that can be interpreted by a browser to reproduce the web page displayed in the graphics window. As changes are made to the objects in the graphics window or to properties of objects in a command window, graphics editor 220 signals code editor 222, which retrieves the objects in object storage 216 and displays the HTML and other code that will allow a browser to render the objects in object storage 224 as close as possible to how those objects are displayed in the graphics window by graphics editor 220. In one embodiment, graphics editor 220 enforces an internally stored set of rules to allow objects to be placed on a page only in a fashion allowed by any limitations of the capabilities of HTML code.

In one embodiment, code editor 222 also acts as a text editor, allowing a user to make changes to the HTML code for the objects displayed by graphics editor. When a user uses code editor 222 to modify the code in the code window, code editor 222 parses the code in the code editor and builds a new set of objects in object storage. Graphics editor 220 compares the new and old set of objects to determine any changes the user has made and then incorporates those changes to refresh the graphics window, for example when the code window loses focus or the graphics window gains it. From that point on, the new objects are used and the old objects are ignored for the purposes of the present invention. Any changes made by the user using code editor 222 will be incorporated into this update.

In one embodiment, each of the objects in object storage 224 are linked to one another in a hierarchical fashion, with child objects having the attributes of the objects from which they descend, and all objects on a page descending from a page object. Code editor 222 and graphics editor 220 build and maintain these links as the page is edited as described above.

In one embodiment, a user may insert one or more blocks of server side code in the web page, each block being stored as an object in object storage 224. The server side code may be inserted using the code editor 222 or may be inserted into the web page using other approaches such as a command window or other graphically based approaches using graphics editor 220. Code editor 222 or graphics editor 220 inserts into object storage 224 an object data structure containing the server side code with a type code identifying the object as server side code, and the server side code itself as a property of the object.

To render the object containing server side code in the graphics window at certain times such as when the object is inserted or edited or the graphics editor 220 uses one of three modes, and optionally any additional information described below, as selected by the user and stored in locations/mode storage 214 by command manager 212 via menu commands, dialog boxes or command windows.

In one mode the user may select, graphics editor 220 displays an internally stored icon that illustrates that the code is not available, at the location of the server side code object in the graphics window.

In another mode the user may select, graphics editor 220 displays example data at the location of the server side code object. Example data is fictitious data, such as randomly generated characters, that has the format of the server side code result if the format is identifiable from the server side code, but example data is not retrieved from any server.

In another mode the user may select, graphics editor 220 displays actual results of the server side code using live data on a server at the location of the server side code object, described in more detail below. If this mode is selected, additional information is received from the user by command manager 212 using menu commands, dialog boxes or one or more command windows. One set of additional information is information about the server used to retrieve the server side code result as described below. The information about the server includes information about storing files on the server such as FTP settings and the like, and information about requesting files from the server, such as the URL that may be used to request web pages from the server. Another set of additional information received from the user is the identification of one of two options for the operation of this mode: manual retrieval and automatic retrieval, described below.

The user selects the mode and specifies any additional information using a menu, dialog box or command window, the selection of which is passed from operating system 208 via input/output 206 to command manager 212. Command manager 212 stores the mode selected in locations/mode storage 214 and provides dialog boxes to identify the options if the server side results mode is selected. Any additional information is also stored by command manager 212 in locations/mode storage 214.

When graphics editor 220 renders an object that has a type indicating it has server side code, graphics editor 220 retrieves the mode and any options and the location of the server from locations/mode storage 214.

If the mode indicates the object should be rendered with an icon, graphics editor 220 renders the icon for the object having a type as server side code. If the mode indicates the object should be rendered with example data, graphics editor 220 attempts to ascertain the format of the data using the server side code in the object in one embodiment or simply identifies the number of characters that will fit in the space provided for each result variable of the server side code and generates a random alphanumeric character as an example result. Graphics editor 220 renders the object with the example data it generates. In one embodiment, the example data is stored in as a property in the server side code object data structure in object storage 224 to allow the same example data to be used if the object is to be rerendered, e.g. because the display is minimized, then maximized.

If the second or third modes are selected (server side code displayed using random data or live data), before initiating the display of the representation of server side code either using example data or live data retrieved from the server, graphics editor 220 marks the file as being "locked for server side code edits". In such embodiment, when the file is locked for server side code edits, graphics editor 220 prohibits any edits to the file in one embodiment, or prohibit edits that change the contents of any server side code object in another embodiment. Other objects that define the characteristics of the server side code object may be changed by the user (e.g. the font of the object) using graphics editor 220 while the file is locked for server side code edits, or objects that are not server side code objects may be changed by the user, but an attempt to edit a server side code object while the file is locked will not be allowed by graphics editor 220. This may be enforced, for example, by graphics editor 220 highlighting the entire object in the graphics window when the user attempts to select it, but not allowing the user to set an insertion point to change the contents of the object that make up the server side code. In another embodiment, changes are allowed, but when a user adds or changes an object having the server side code object type, graphics editor 220 or code editor 222 deletes any existing content parameter in the object data structure for the object being changed and graphics editor 220 renders the object as an icon until server side code for the object is retrieved after the file is unlocked as described herein. In the case of the second mode, in which example data is used, graphics editor 220 unlocks the file for server side code edits once it displays the example data.

In the event that the user has selected the actual server side code results mode as described above, under certain circumstances described below, graphics editor 220 retrieves server side code results from the server as will now be described, and the server side code results are used by graphics editor 220 to render each server side code object in the graphics window. Server side code results are the results produced by a server capable of processing server side code when a web page that may or may not contain server side code is requested from the server. Each result corresponds to one or more tags or blocks of server side code in the source code for the web page.

The server side code results may be retrieved once for an object and any server side code result that is different from the source code that generated it may be stored as a property in the object data structure for one or more objects as described below so that the same data can be used to rerender the object, or the server side code result may be retrieved from the server either periodically or whenever any server side code is modified as described below. In one embodiment, code editor 222 displays the server side code in the code window while the graphics window displays the server side code results as described below.

To retrieve live data as server side code results from the server, graphics editor 220 locks the file for server side edits and signals object/code file manager 236. In one embodiment, object/code file manager 236 first checks locations/mode storage 214 to determine which mode is current.

Object/code file manager 236 signals tagger 246, which builds a file containing a special version of the source code for the web page specified by the user via graphics editor 220, code editor 222 or both, either from the object data structures in object storage 224 as described above, or from the code in the code window retrieved from code editor 222. The special version of the source code for the web page is a duplicate of what appears in the code window, containing server side code and HTML tags for the objects specified on the page, plus special tags and special attributes as described below. Tagger 246 signals object/code file manager 236 when it finishes sending the page by providing a handle to the file.

As tagger 246 builds the file, it adds special tags and special attributes to the file, and so the file is referred to herein as a "specially tagged file". As described above, a server side code object may contain a block of server side code, containing one or more lines of server side code, beginning and ending with server side code delimiters but not including static HTML code that is not part of the server side code. Each time tagger 246 generates the source code for a server side code object containing a block of server side code, it adds to the specially tagged file a special tag before the beginning and after the end of the block to allow the result of the server side code to be identified as a server side code result and to allow the location in the tagged file to be matched to the location in the result as described in more detail below. In one embodiment, the special tag is an HTML comment containing characters that a user would unlikely use as their own comment (in order to distinguish the special tags from user-supplied comments) and a number used as an identifier of the special tag, beginning with zero, such as <!--MMDW 0-->. The identifier is incremented for each special tag added by tagger 246 to ensure each special tag has its own unique identifier. As described above, the result of server side code will look like ordinary HTML code, so the tagging process can assist the system 200 in locating the server side code result produced by that object from the remainder of the web page when the web page is requested and received as described below. For example, the code:

<% IF (condition) {%>
    <IMG SRC="ONE.GIF">
    <%} ELSE {%>
    <IMG SRC="TWO.GIF">
    <% FOO="BAR" %>
    <%} %> (Example 1)
would become in the tagged file:
    <!--MMDW 0-->
    <% IF (condition) {%>
    <!--MMDW 1-->
    <IMG SRC="ONE.GIF">
    <!--MMDW 2-->
    <%} ELSE {%>
    <!--MMDW 3-->
    <IMG SRC="TWO.GIF">
    <!--MMDW 4-->
    <% FOO="BAR" %>
    <%} %>
    <!--MMDW 5--> (Example 2)

As tagger 246 is building the specially tagged file, it also adds special attributes to the non-server side code HTML tags and other tags that are produced as the source code for an object that is not a server side code object. Such objects may include server side code directives to replace the directive with a value, but are not entirely made of server side code commands. Special attributes allow each tag that is not part of the server side code but returned by the server to be associated with the object in object storage 224 corresponding to the tag as described in more detail below. This allows the system to detect and display the web page using attribute values that are returned by the server if such attribute values are different from the source code for the web page, even if the attribute is not part of the server side code. Such differences can arise if server side code is used to set the value of a variable subsequently as an attribute in a tag that is not part of the server side code. In one embodiment, each special attribute has the format "MMDW=N" where "N" is a unique identifier of the special attribute, starting with 0 and being sequentially numbered for each special attribute. Because the server that executes the server side code does not interpret non-server side code, the fact that the MMDW attribute is not a valid attribute will not affect the server, which will simply return the MMDW attribute unchanged. Thus, the code:

<% FOO="ONE.GIF" %>
    <IMG SRC="<%=FOO%>"> (Example 3)
would become:
    <!--MMDW 0-->
    <% FOO="ONE.GIF" %>
    <!--MMDW 1-->
    <IMG MMDW=0 SRC="<%=FOO%>"> (Example 4)

Referring also to FIG. 7, as tagger 246 builds the special tags or special attributes, it adds the identifiers identifier 1, identifier 2 of both of the special tags of the pair surrounding a server side code object object type 1 or adds the identifier identifier 3 or identifiers of the special attribute to the object object type 2 corresponding to the special tag or special attribute in object storage 224 or otherwise associates the identifier of the special tag or special attribute to the object or portion of the source code corresponding to the tag.

Tagger 246 then passes a handle to the specially tagged file to object/code file manager 236. In one embodiment, the combination of HTML and code producer 232, object/code file manager 236 and tagger 246 is referred to as a source code provider 247.

Object/code file manager 236 requests a filename from temporary file namer 230 to name the specially tagged file to be sent to the server. Temporary file namer 230 generates a file name using a combination of any of two or more of the date and time received from the system clock of operating system 208, the amount of time since the operating system booted and a random number it generates, and passes the file name to object/code file manager 236. Object/code file manager 236 retrieves from locations/mode storage 214 information about the server, such as its location, and FTP details used to store files specified by the user or otherwise. Object/code file manager 236 then signals communication interface 250 to connect to the server using conventional protocols such as FTP and the additional information stored in locations/mode storage 214 as described above, and sends the specially tagged file produced by tagger 246 to the server using the name of the file received from temporary file namer 230 and the storage information retrieved from locations/mode storage 214.

When communication interface 250 finishes uploading the specially tagged file, it signals object/code file manager 236. Object/code file manager 236 retrieves from locations/mode storage 214 the server retrieval information (e.g. the URL and path from which web pages may be requested) specified by the user, signals web page requester 254 with the URL of the server and any path, and the name of the specially tagged file it stored on the server as described above. Web page requester 254 generates a request for the web page at the URL, path and filename it receives. Object/code file manager 236 initializes secondary content fields in all of the objects in object storage 224 to nil and signals file differencer 256 with the handle of the tagged copy of the file. Secondary content fields are used to store server side code results retrieved from the web page that are different from the source code that generated them for use as described below.

Figure 2B:
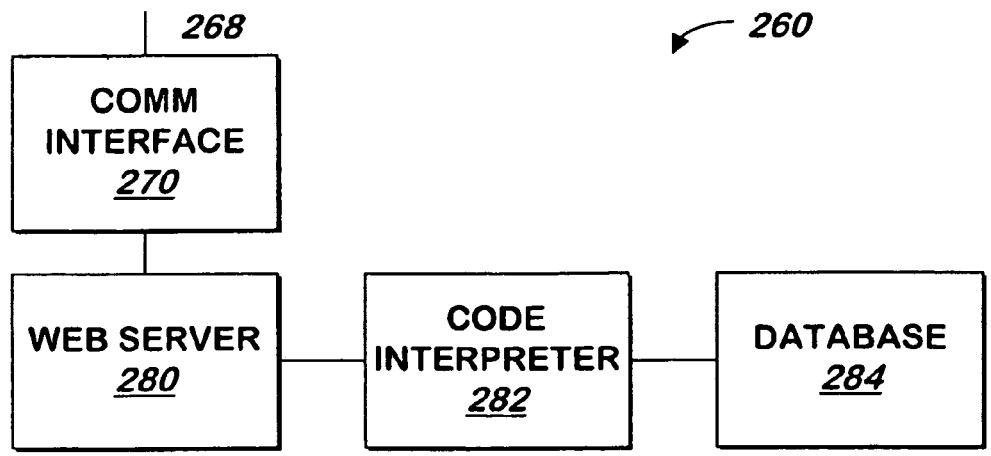
FIG. 2B is a block schematic diagram of a conventional server system for serving web pages with optional server side code according to one embodiment of the present invention.

Referring momentarily to FIG. 2B, a conventional server 260 capable of processing server side code is shown. FIG. 2B is described merely as one example of how a server that processes server side code can operate, but the present invention works with all servers that process server side code. Communication interface 270, which may be any conventional communications interface such as a conventional TCP/IP compatible communications interface, LAN interface or WAN interface, can receive at input/output 268 a file and commands to store the file along with a filename and path to use to store the file and passes this information to web server 280, which stores the file using the name and path received. Web server 280 is a conventional web server and may include the conventional Apache Server program or another similar web server program. Web server 280 also includes conventional storage such as disk storage into which the files are stored.

Communications interface 270 also receives the request for the file via input/output 268 from web page requester 254. The request contains a URL of the server, optional path and filename specifying the file that is used to request the web page. Communications interface 270 passes the file name and path to web server 280 and a command to provide the file. When web server 280 receives the file name and path and command, web server 280 strips the URL from the request and retrieves the file having the name and path sent with the command. Web server 280 sends the file to code interpreter 282.

Figure 2C:
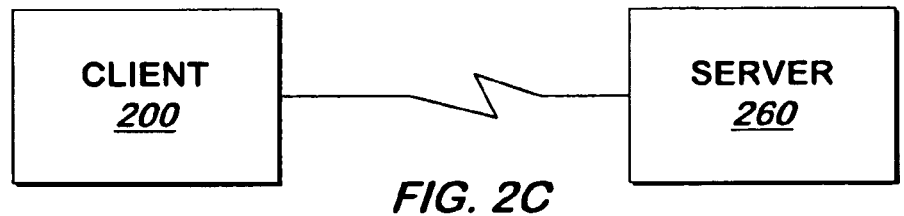
FIG. 2C is a block schematic diagram of a conventional client-server computer system coupled using either a local area network or the Internet according to one embodiment of the present invention.

Code interpreter 282 compiles the original file received from web server 280 into a file containing non-server side code such as the source HTML, plus codes such as byte codes corresponding to the server side code in the file that it identifies by the delimiters for the server side code. Code interpreter 282 then interprets the file, a portion, such as a byte or a number of bytes, at a time, by copying the file containing the byte codes or other similar codes into a working file it stores on web server 280. Before each portion is written to the working file, code interpreter 282 scans the portion for the byte codes. If one or more byte codes are found, instead of copying the portion to the working file, code interpreter 282 executes the code or codes, for example by retrieving data specified in the code from database 284, which may be any conventional database. Code interpreter 282 substitutes in the working file the result of the execution of the byte codes in place of the segment containing the byte codes in the file containing them. Code interpreter 282 continues copying into the working file non-server side code or substituting the results of server side code as described above until it reaches the end of the original file. Code interpreter 282 returns the name of the working file with the server side code result to web server 280, and web server 280 passes the file as a web page to communication interface 250 via input/output 252 of the system 200 via the server's 260 communications interface 270 and input/output 268 coupled to the Internet or another local area or wide area network, as shown in FIG. 2C. FIG. 2C shows only one client system 200 and one server 260, although other numbers of client systems 200 and servers may be used 260.

Referring again to FIG. 2A, file differencer 256 receives the web page requested by web page requester 254 via communication interface 250, and the source code for the web page received is referred to herein as the server side code results. File differencer 256 then scans the server side code results as set forth below and associates portions of the server side code results with the block of server side code that caused some or all of the portion to be created, and also determines whether any of the tags marked with the special attributes have had any other attributes changed by operation of the server side code using a method which will now be described.

Figure 5:
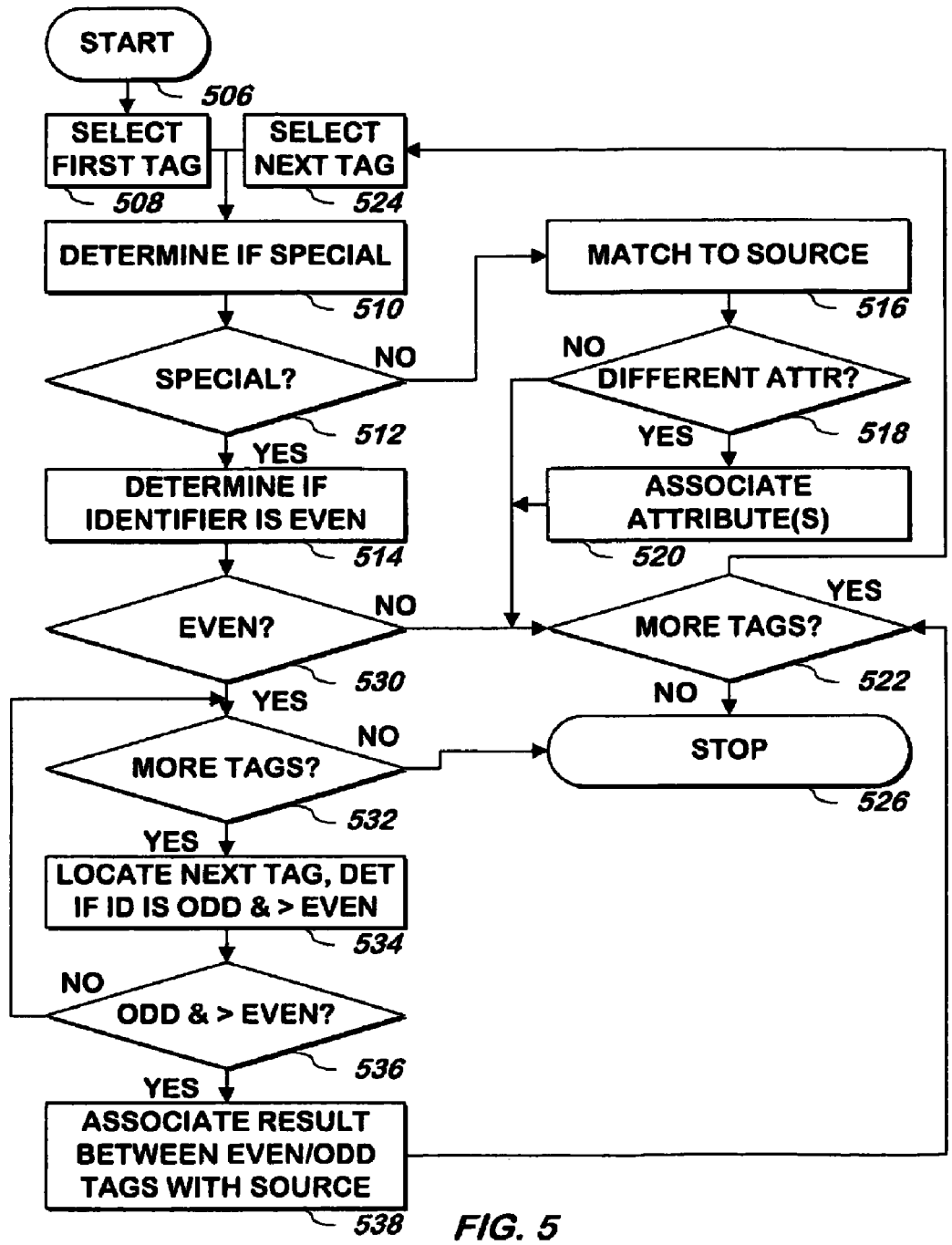
FIG. 5 is a flowchart illustrating a method of associating server side code results with the portion of source code that generated the result according to one embodiment of the present invention.

Referring now to FIG. 5, a method of associating certain server side code results with a portion of the source code used to generate the results is shown according to one embodiment of the present invention. After the method begins 506, the first tag in the server side code results is selected 508. A determination is made 510 as to whether the selected tag is a special tag, such as by identifying whether the tag has the form of a special tag described above. If the tag is a special tag 512, the method continues at step 512 and otherwise, the method continues at step 516.

At step 516, the selected tag was not a special tag, and so the tag is matched to the source code for the object corresponding to the tag using the identifier of the special attribute of the selected tag 516 located in the selected tag. In one embodiment, step 516 is performed by locating the special attribute identifier and matching it to the object assigned that identifier and comparing the tag that would be generated as source code for that object (which may be stored in the starting tag or ending tag property of the object) with the selected tag from the server side code result. If the value of one or more of the attributes of the selected tag (other than the special attribute) is different from the value of the attribute for the source code of the object 518, the selected tag from the server side code results are associated 520 with the object matched to it, for example by copying the attributes other than the special attribute to a secondary content field of the object having the matching special attribute identifier in object storage 224. The method then continues at step 522.

At step 522, if there are more tags in the server side code results 522, the next tag is selected 524 and the method continues at step 512, and otherwise, the method of association terminates 526.

At step 512, if the tag is a special tag, a determination is made whether the tag is an even-numbered tag 514. If the identifier of the tag is not an even number, the method continues at step 522, and otherwise, the method continues at step 532.

At step 532, if there are no more tags, the method terminates 526 and otherwise, the method continues at step 534, where the next tag in the server side code results file is located and a determination is made whether the identifier for the tag is odd-numbered and greater than the even numbered tag determined in step 514. If the tag located does not have an identifier that is odd-numbered and greater than such even-numbered tag, the method continues at step 532, and otherwise, all of the results from the server side code results between the even numbered selected tag identified in the most recent iteration of step 530 and the most recent iteration of step 536 is associated 538 with the object corresponding to the server side code results having the even-numbered tag (for example, by copying this result into the secondary content property of the object corresponding to the even-numbered special tag in object storage 224), along with an identifier of the odd numbered tag. The method continues at step 522. It is noted that in some embodiments, the "no" branches from steps 530 and 536 will never be traversed, and so these tests are not performed.

There are many other ways of associating server side code results with the source code or objects used to generate them. For example, the server side code results may be associated with the source code (or a copy of the source code) produced by tagger 246 instead of the objects in object storage. In such embodiment, when file differencer 256 detects a server side code result between a pair of even- and "odd-numbered, and greater than the even-numbered tag" tags as set forth above, file differencer 256 adds to that source code or copy of the source code a "begin lock" HTML comment tag, which is a conventional HTML comment tag that identifies the beginning of a locked region and can be distinguished from user-supplied comments, and file differencer 256 moves the source code that was between the pair of tags into the comment and deletes the pair of special tags and any special tags in the source code it moves. File differencer 256 adds the server side code results after the begin lock comment tag and then adds an "end lock" comment tag, an HTML comment tag that identifies the end of a locked region and can be distinguished from user-supplied comment tags. In this case, the code itself can be seen as an object and the server side results for the code are associated with that object in this manner.

In one embodiment, attributes are associated with the corresponding tag by file differencer 256 by replacing the special attribute in the source code with a special result attribute, MMTranslatedvalue="Attribute=\"Changed Result\"", where "attribute" is the attribute changed by the server and "changed result" is the value of the attribute that was returned from the server different from the source code. Thus the last line in Example 4 would become <IMG MMTranslatedValue="src=\"one.gif\" " src="<%=foo%>"> or another similar tag. If multiple attributes are changed by the server, multiple special result attributes, one or more for each changed attribute, will be placed in the tag by file differencer 256 in place of the special tag.

When the process of differencing the file is complete, file differencer 256 builds a set of objects from the resulting file in a manner that allows graphics editor 220 to display the server side code results but allows code editor 222 to display the source code and replaces the objects stored in object storage 224 with the new set of objects it builds. For example, file differencer 256 would build an object allowing graphics editor 220 to interpret the tag <IMG SRC="one.gif"> and display the result, and code editor 222 to display the source code as <IMG SRC="<%FOO%>"> when it builds the object in the new set of objects for the last line of Example 4.

Referring again to FIG. 2, in one embodiment, when the end of the web page containing the server side code results is reached, file differencer 256 instructs graphics editor 220 to reload the graphics window using object storage 220 and if the file is locked for server side code edits, graphics editor 220 unlocks the file. Graphics editor 220 reloads the graphics window by scanning each object in object storage 224, using either the source code for the object if no secondary content property exists for that object, or using secondary content property rather than the source code for the object if the secondary content property contains code for that object, to display the objects on the page in a manner similar to a conventional browser. In the case of server side code objects, graphics editor 220 uses the secondary content field in place of the source code for the objects beginning with the object containing the secondary content field through the server side code object corresponding to the odd numbered special tag identifier associated with that object as described above, including all objects that would be displayed in between these two objects. Code editor 222 continues to use the starting and ending tag properties stored in the object, so that the user can see the results in the graphics window, but sees the source in the code window.

In one embodiment, if the user adds a new server side code object to the web page during the retrieval of the server side code results (e.g. while the file is locked for server side code changes), an icon is displayed by graphics editor 220 for such results until the next retrieval of the server side code results can be performed.

In one embodiment, when sample data or server side code results are displayed in place of a server side code object in the graphics window, the user can graphically edit the location or formatting of the object by moving the object in the graphics window or changing certain characteristics, such as the size of the cells into which table data will be presented, background color or image, font color or font size. To change characteristics of the server side code objects, the user may point to data in the server side code object or the first row of a tabular server side code result that is displayed in the graphics window and click the mouse. Graphics editor 220 highlights the object corresponding to the location of the mouse as described above and allows the user to change its characteristics graphically. For example, a user may adjust the size of a cell by dragging one of the size buttons on the outline of the cell that is displayed by graphics editor to indicate the selection of that cell. Graphics editor 220 updates size parameters in the corresponding object data structure in object storage 224 and displays all cells in the column for that object with the same characteristics as the first cell in the column according to any changes made by the user. When code editor 222 or HTML and code producer 232 generates the source code for the web page, they will include a width or height specification to the TD HTML tag according to the width or height selected by the user.

In one embodiment, only the first row in a table having sample data or live data is modifiable in this fashion, although in other embodiments, any row may be modified in this manner and the other rows are adjusted to match it.

In one embodiment, processing server side code and rendering its results as is described herein may be performed under two circumstances. In the first circumstance, the user uses command manager 212 to request the process be performed. A user may use command manager 212 in this fashion if the user has selected the manual retrieval option or automatic retrieval option. In such embodiment, command manager 212 signals graphics editor 220 to initiate the process as described herein. In such embodiment, the process is performed whenever the user requests it. A user may request it, for example, to view changes to data on the server over time, even though none of the server side code objects may have been edited by the user.

If the user has selected the automatic retrieval option the retrieval process described above is performed whenever graphics window refreshes some or all of the graphics window, such as when the user clicks out of the text portion of a server side code object in the graphics window, provided any server side code on the page has been edited since the last time the server side code results were retrieved and displayed as described herein. If the user edits the server side code, code editor 222 or graphics editor 220, whichever was used by the user to edit the server side code, flags the file as having had server side code modified. When the graphics window gains focus or otherwise is to be refreshed, graphics editor 220 checks the flag, and if set, performs the retrieval of server side code results process described herein and clears the flag. If the flag is not set, the process of retrieving server side code results and associating them and displaying them in the graphics window as described herein is not performed. Refreshes use the current values stored in the object data structures in object storage 224.

In one embodiment, the user may select whether or not the server side code results in the graphics window should be refreshed periodically, for instance, so that as the data changes on the server, those changes are periodically reflected in the graphics window. The user makes this selection using a menu command, dialog box or command window using command manager 212, and command manager 212 stores in locations/mode storage 214 the selection, including an optional refresh period or rate as additional information for the server side code results mode and sets a timer using operating system 208.

If the user has chosen for the graphics window to be refreshed periodically, the timer in operating system 208 periodically signals graphics editor 220, which responds by repeating the process of retrieving and displaying server side code results as described herein. In one embodiment, before graphics editor 220 attempts to retrieve server side code results, it checks to see if any object data structures in object storage 224 are of the server side code type. If not, graphics editor 220 does not attempt to retrieve server side code results as described above—it just refreshes the graphics window without retrieving the server side code results as described herein.

In one embodiment, the user may use a menu command to command the system 200 to show the web page in one or more browsers. This allows the designer to view the web page in one or more external browsers 240 to view any browser-specific issues with the web page. Each external browser 240 may be any conventional browser, such as the conventional Internet Explorer commercially available from Microsoft Corporation of Redmond, Wash. or the conventional Navigator product commercially available from Netscape Corporation of Mountain View, Calif. When command manager 212 receives an indication of the command from operating system 208, command manager 212 signals object/code file manager 236, which requests a temporary file name from temporary file namer 230.

Temporary file namer 230 generates a temporary file name as described above. The temporary file name may be produced by incorporating a random number and date and time into the name of the file to prevent another temporary file from being overwritten by the new temporary file. Temporary file namer 230 returns the temporary file name to object code/file manager 236.

In one embodiment, object/code file manager 236 retrieves from locations/mode storage 214 the local storage path defined by the user using a menu command, dialog box or command window via command manager 212, which stored the path in locations/mode storage 214.

Object code/file manager 236 passes the temporary file name it receives and path it retrieves to HTML and code producer 232. HTML and code producer 232 uses the objects in object storage 224 to generate an HTML file that is a duplicate of the code in the code window (without adding special tags or special attributes or using any server side code results stored in the secondary content properties of the objects) using the file name and path it receives and writes the contents of the file into the file into local storage 242, which may be conventional disk storage or other storage. Local storage 242 may reside on the user's computer system or a remote computer system connected by a LAN or WAN. The HTML file includes HTML code and may also include one or more forms of server side code, such as ASP, JSP and CFML (described above).

Object/code file manager 236 passes the temporary file name to external browser 240 in a request to retrieve and display the file. External browser 240 renders the file so that the user may view it.

A user may save the HTML file or a file containing the object data structures using a menu command or other command. Command manager 212 receives the command from operating system 208 and signals object/code file manager 236. If the command is a command to save the object data structures, object/code file manager 236 retrieves the objects from object storage 224 and builds and stores a file containing the objects, and optionally includes in the file the modes, additional information and locations stored in locations/mode storage 214. In one embodiment, secondary content properties are not stored as part of this file. If the command is a command to save an HTML file, object/code file manager 236 signals HTML and code producer 232 to generate the file. HTML and code producer 232 generates the file as described above. If necessary, object/code file manager 236 prompts the user for the file name and path and if the file is an HTML file, object code and file manager 236 passes the name and path to HTML and code producer 232.

Figure 3:
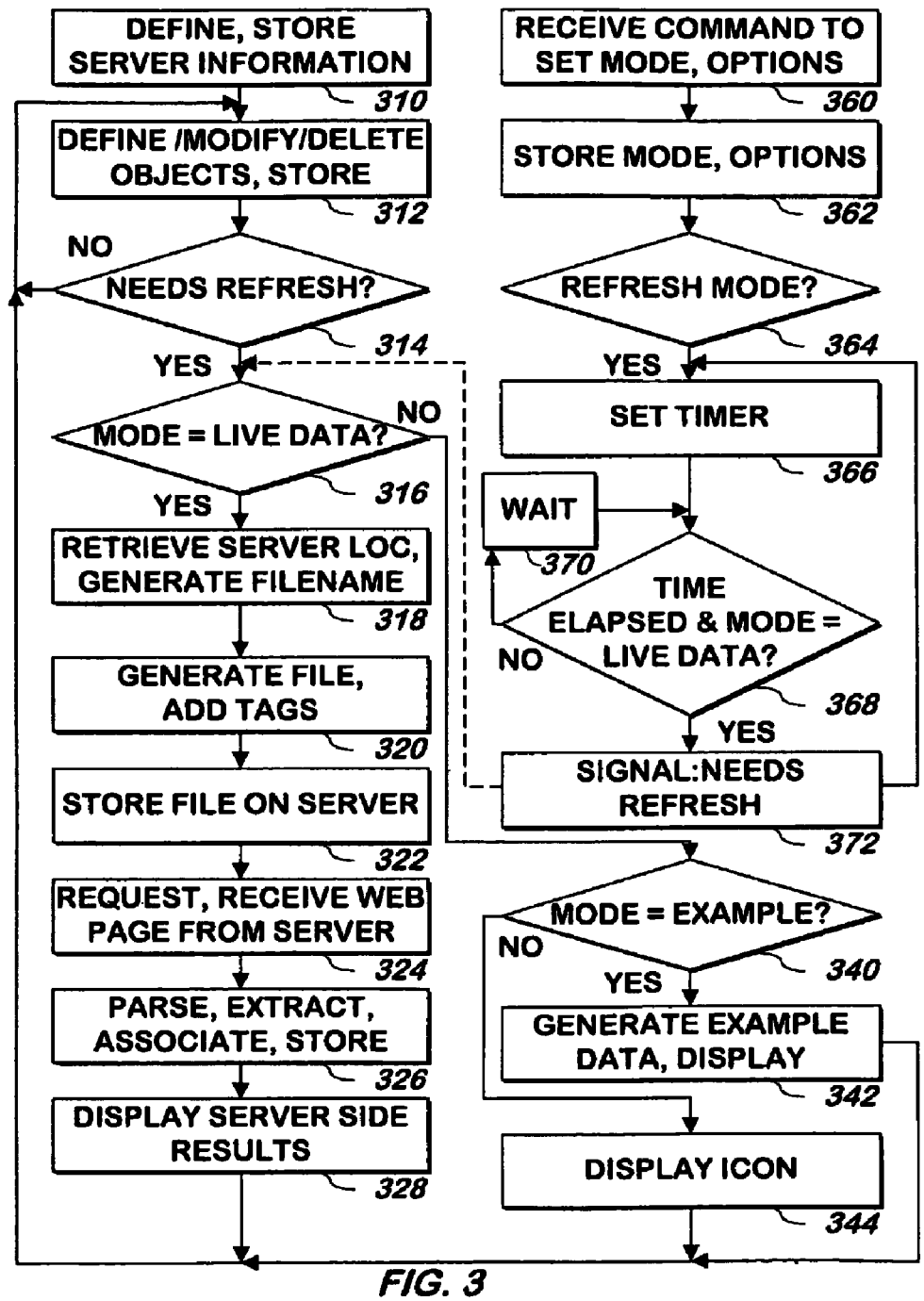
FIG. 3 is a flowchart illustrating a method for displaying and updating server side code results in a web authoring tool or other application program according to one embodiment of the present invention.

Referring now to FIG. 3, a method for displaying a web page is shown according to one embodiment of the present invention. Information about a server, such as the address for requests for web pages made to that server, and information about how to upload files to the server is received and stored 310. The web page is defined 312 by receiving information about the deletion, insertion or modification of objects on the web page, either using a graphical user interface or a text editor, or both as described above. If the graphical user interface requires refreshing with live data 314, because for example, server side code objects on the web page have been edited graphically or via the text editor or because one has been requested by the user, a mode is checked and otherwise the method continues at step 312.

If the mode corresponds to the display of server side results 316, information about the storage of a web page on a server, such as the location of the server and path information of the location of the file, is retrieved, having been entered in step 310, and a temporary filename is generated as described above 318. A specially tagged file is generated using the source code of the web page and special tags and special attributes as described above as described above 320.

Figure 6:
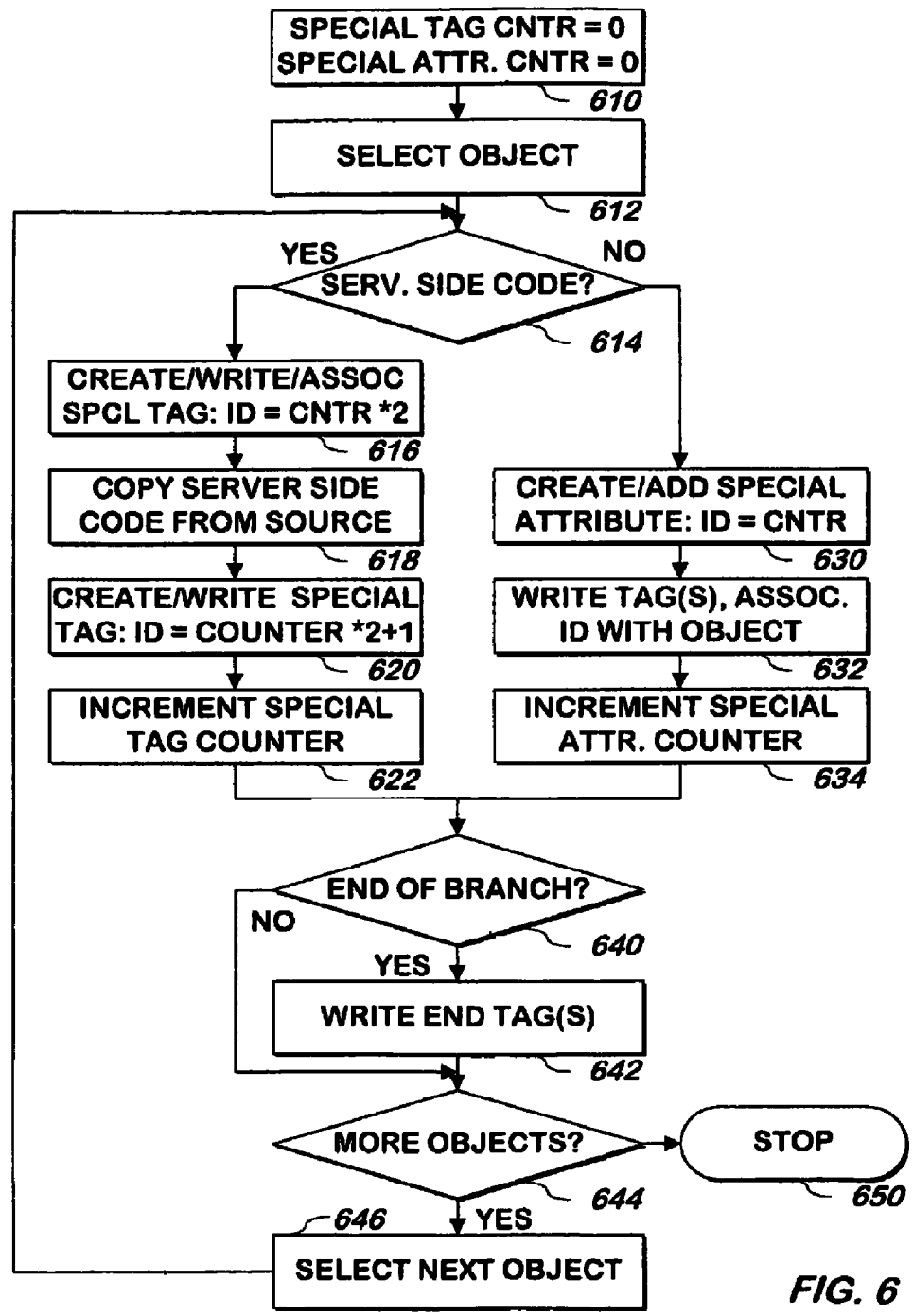
FIG. 6 is a flowchart illustrating a method of creating a specially tagged file according to one embodiment of the present invention.

Referring momentarily to FIG. 6, a method of creating a specially tagged file is shown according to one embodiment of the present invention. Counters for special tags and special attributes are cleared to zero 610 and an object is selected 612. In one embodiment objects are arranged as a hierarchy as described above, but it is not necessary that object be so arranged.

If the selected object is a server side code object 614, a special tag is created and written into the file as described above, using an identifier equal to the special tag counter multiplied by two, and the identifier, and optionally another value, one greater than the identifier, is associated with the selected object 616. The server side code is copied from the source property of the object into the file 618 and another special tag is created and written into the file using an identifier equal to the special tag counter, multiplied by two and incremented by one 620. The special tag counter is incremented 622 and the method continues at step 640.

If the selected object is not server side code 614, a special attribute is created as described above using an identifier equal to the value of the special attribute counter, added to the existing source code tag 630, and the tag with the special attribute is written into the file as described above 632. The special attribute counter is incremented 634 and the method continues at step 640.

At step 640 if the selected tag is at the end of a branch of the tree 640, the end tag or tags is/are written from the source code of the object and any parent object from which no other unprocessed object descends 642, and the method continues at step 644 and otherwise 640, the method continues at step 644. If there are additional objects not processed as described above 644, the next object is selected 646, either by selecting an object descending from the selected object or, if no such object exists, selecting a descendant object of the ancestor object of the selected object that is nearest to the selected object. Otherwise 644, the method terminates 650.

Referring again to FIG. 3, the specially tagged file is stored 322 on the server using the information retrieved and the filename generated in step 318. The web page corresponding to the file stored in step 322 is requested and received 324 from the server using the file name generated in step 320 and the information about the location of the server defined in step 310. The web page is parsed and certain of the server side code results are extracted and associated with the server side code or objects corresponding to the server side code as described above 326 and with reference to FIG. 5. The objects including associated server side results are displayed 328, such as by placing them into the graphics window as described above. The method continues at step 312.

If the mode does not correspond to the display of server side code results 316, but corresponds to the display of example data 340, example data is generated and displayed 342 as described above and otherwise, an icon is displayed 344 in place of each server side code object as described above. The method continues at step 312. The characteristics of the server side results may be modified in step 312 as described above and the modifications are stored so that any server side results generated from the server side code that generated the results will be displayed with the same display parameters.

One or more commands may be received to set the mode and options as described above at step 360 and the mode and options are stored 362. If the periodic refresh option for the mode corresponding to the display of server side code results was selected 364, a timer is set 366. When the timer elapses, if the mode is still set to refresh mode 368, a signal is sent to initiate steps 318 through 328, such as forcing a refresh of the graphics window 372 or using another method. Otherwise, the method waits until the timer elapses 370 (or another mode is selected at step 360) and repeats step 368.

Figure 4:
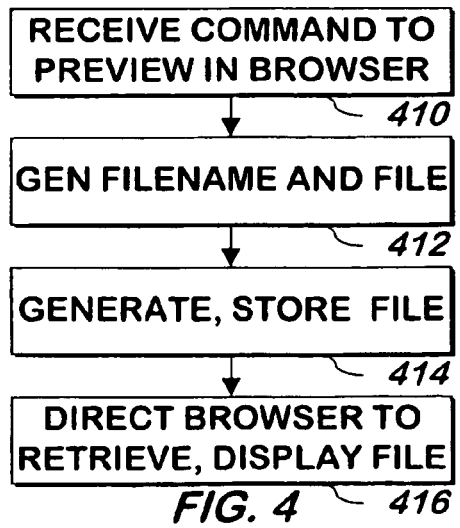
FIG. 4 is a flowchart illustrating a method for previewing a web page in a browser according to on embodiment of the present invention.

Referring now to FIG. 4, a method of previewing a web page in a browser is shown according to one embodiment of the present invention. The web page may be the web page defined in step 312 of FIG. 3. A command to preview the web page in a browser is received 410 as described above. A filename for the web page is generated 412 as described above and the source code for the web page is generated in a file without the server side code results and stored 414 as described above using the filename generated in step 412. A browser is directed to retrieve and display the file using the filename generated in step 412.

What is claimed is:

1. A method of generating a file, the method comprising:
copying non-server side code associated with an original file into a working file, wherein the original file comprises server side code and non-server side code;
identifying a plurality of server side code delimiters associated with the original file;
executing one or more server side code instructions corresponding to the identified server side code delimiters to generate server side code results; and
inserting the server side code results into the working file;
wherein the server side code delimiters comprise a start delimiter and an end delimiter, and a unique identifier is associated with each of the start delimiter and the end delimiter, and a value of the unique identifier associated with the end delimiter is greater or less than a value of the unique identifier associated with the start delimiter.

2. The method of claim 1, further comprising:
displaying the working file as a web page.

3. The method of claim 2, further comprising:
rendering the server side code results to generate a displayable object.

4. The method of claim 2, wherein the one or more server side code instructions at least partially define an object corresponding to the web page.

5. The method of claim 1, further comprising:
storing the one or more server side code instructions in an object data structure as a first object property corresponding to an object.

6. The method of claim 5, further comprising:
storing the server side code results in the object data structure as an additional object property corresponding to the object.

7. A non-transitory storage device encoding a computer program product configured to cause data processing apparatus to perform operations comprising:
copying, at a client, non-server side code associated with an original file into a working file, wherein the original file comprises server side code and non-server side code;
identifying, at the client, a plurality of server side code delimiters associated with the original file;
transmitting one or more server side code instructions corresponding to the identified server side code delimiters to a server;
receiving server side code results corresponding to the one or more server side code instructions; and
inserting, at the client, the server side code results into the working file;
wherein the copying comprises copying the server side code and the identified server side code delimiters into the working file with tags added to the working file for the server side code, the transmitting comprises sending the working file to the server, the receiving comprises receiving a processed version of the working file from the server, the processed file including the server side code results and the added tags, the inserting comprises using the added tags to locate where to put the server side code results from the processed file into the working file in place of the server side code and the identified server side code delimiters.

8. The storage device of claim 7, wherein the operations comprise:
displaying the working file as a web page.

9. The storage device of claim 8, wherein the operations comprise:
adding attributes to the working file before sending the working file to the server;
using the added attributes to detect attribute values returned by the server in the processed file; and
rendering the server side code results to generate a displayable object.

10. The storage device of claim 9, wherein the one or more server side code instructions at least partially define an object corresponding to the web page.

11. The storage device of claim 7, wherein the server side code delimiters comprise a start delimiter and an end delimiter.

12. The storage device of claim 11, wherein a unique identifier is associated with each of the start delimiter and the end delimiter, and the value of the unique identifier associated with the end delimiter is greater than the value of the unique identifier associated with the start delimiter.

13. The storage device of claim 7, wherein the operations comprise:
storing the one or more server side code instructions in an object data structure as a first object property corresponding to an object.

14. The storage device of claim 13, wherein the operations comprise:
storing the server side code results in the object data structure as an additional object property corresponding to the object.

15. A system comprising:
a server; and
a client computing system including a computer-readable medium storing an original file and processor electronics configured to perform operations comprising:
copying, at the client, non-server side code associated with the original file into a working file, wherein the original file comprises server side code and non-server side code;
identifying, at the client, a plurality of server side code delimiters associated with the original file;
transmitting one or more server side code instructions corresponding to the identified server side code delimiters to the server;
receiving server side code results corresponding to the one or more server side code instructions; and
inserting, at the client, the server side code results into the working file;
wherein the copying comprises copying the server side code and the identified server side code delimiters into the working file with tags added to the working file for the server side code, the transmitting comprises sending the working file to the server, the receiving comprises receiving a processed version of the working file from the server, the processed file including the server side code results and the added tags, the inserting comprises using the added tags to locate where to put the server side code results from the processed file into the working file in place of the server side code and the identified server side code delimiters.

16. The system of claim 15, wherein the processor electronics are further configured to perform operations comprising:
displaying the working file as a web page on a display associated with the client.

17. The system of claim 16, wherein the processor electronics are further configured to perform operations comprising:
adding attributes to the working file before sending the working file to the server;
using the added attributes to detect attribute values returned by the server in the processed file; and
rendering the server side code results to generate a displayable object.

18. The system of claim 17, wherein the one or more server side code instructions at least partially define an object corresponding to the web page.

19. The system of claim 15, wherein the server side code delimiters comprise a start delimiter and an end delimiter.

20. The system of claim 19, wherein a unique identifier is associated with each of the start delimiter and the end delimiter, and the value of the unique identifier associated with the end delimiter is greater than the value of the unique identifier associated with the start delimiter.

21. The system of claim 15, wherein the processor electronics are further configured to perform operations comprising:
storing the one or more server side code instructions on the computer-readable medium in an object data structure as a first object property corresponding to an object.

22. The system of claim 21, wherein the processor electronics are further configured to perform operations comprising:
storing the server side code results in the object data structure as an additional object property corresponding to the object.

23. A method comprising:
copying, at a client, non-server side code associated with an original file into a working file, wherein the original file comprises server side code and non-server side code;
identifying, at the client, a plurality of server side code delimiters associated with the original file;
transmitting one or more server side code instructions corresponding to the identified server side code delimiters to a server;
receiving server side code results corresponding to the one or more server side code instructions; and
inserting, at the client, the server side code results into the working file;
wherein the copying comprises copying the server side code and the identified server side code delimiters into the working file with tags added to the working file for the server side code, the transmitting comprises sending the working file to the server, the receiving comprises receiving a processed version of the working file from the server, the processed file including the server side code results and the added tags, the inserting comprises using the added tags to locate where to put the server side code results from the processed file into the working file in place of the server side code and the identified server side code delimiters.

24. The method of claim 23, further comprising:
adding attributes to the working file before sending the working file to the server;
using the added attributes to detect attribute values returned by the server in the processed file; and
rendering the server side code results to generate a displayable object.

25. The method of claim 23, wherein the server side code delimiters comprise a start delimiter and an end delimiter, a unique identifier is associated with each of the start delimiter and the end delimiter, and the value of the unique identifier associated with the end delimiter is greater than the value of the unique identifier associated with the start delimiter.

26. The method of claim 23, further comprising:
storing the one or more server side code instructions in an object data structure as a first object property corresponding to an object; and
storing the server side code results in the object data structure as an additional object property corresponding to the object.

27. A non-transitory storage device encoding a computer program product configured to cause data processing apparatus to perform operations comprising:
- copying non-server side code associated with an original file into a working file, wherein the original file comprises server side code and non-server side code;
- identifying a plurality of server side code delimiters associated with the original file;
- executing one or more server side code instructions corresponding to the identified server side code delimiters to generate server side code results; and
- inserting the server side code results into the working file;
- wherein the server side code delimiters comprise a start delimiter and an end delimiter, and a unique identifier is associated with each of the start delimiter and the end delimiter, and a value of the unique identifier associated with the end delimiter is greater or less than a value of the unique identifier associated with the start delimiter.

28. The storage device of claim 27, wherein the operations comprise:
- displaying the working file as a web page; and
- rendering the server side code results to generate a displayable object;
- wherein the one or more server side code instructions at least partially define an object corresponding to the web page.

29. The storage device of claim 27, wherein the operations comprise:
- storing the one or more server side code instructions in an object data structure as a first object property corresponding to an object; and
- storing the server side code results in the object data structure as an additional object property corresponding to the object.

30. A system comprising:
- a server; and
- a client computing system including a computer-readable medium storing an original file and processor electronics configured to perform operations comprising:
  - copying non-server side code associated with an original file into a working file, wherein the original file comprises server side code and non-server side code;
  - identifying a plurality of server side code delimiters associated with the original file;
  - executing one or more server side code instructions corresponding to the identified server side code delimiters to generate server side code results; and
  - inserting the server side code results into the working file;
- wherein the server side code delimiters comprise a start delimiter and an end delimiter, and a unique identifier is associated with each of the start delimiter and the end delimiter, and a value of the unique identifier associated with the end delimiter is greater or less than a value of the unique identifier associated with the start delimiter.

31. The system of claim 30, wherein the processor electronics are further configured to perform operations comprising:
- displaying the working file as a web page; and
- rendering the server side code results to generate a displayable object;
- wherein the one or more server side code instructions at least partially define an object corresponding to the web page.

32. The system of claim 30, wherein the processor electronics are further configured to perform operations comprising:
- storing the one or more server side code instructions in an object data structure as a first object property corresponding to an object; and
- storing the server side code results in the object data structure as an additional object property corresponding to the object.

* * * * *